(12) United States Patent
Calhoun et al.

(10) Patent No.: US 10,342,360 B2
(45) Date of Patent: Jul. 9, 2019

(54) ANTIMICROBIAL DISPOSABLE SEAT COVER

(71) Applicant: LARKING, INC., San Diego, CA (US)

(72) Inventors: Lara D. Calhoun, San Diego, CA (US); Ashkan King Aminpour, San Diego, CA (US)

(73) Assignee: LARKING, INC., San Diego, CA (US)

( * ) Notice: Subject to any disclaimer, the term of this patent is extended or adjusted under 35 U.S.C. 154(b) by 0 days.

(21) Appl. No.: 15/665,239

(22) Filed: Jul. 31, 2017

(65) Prior Publication Data

US 2018/0027987 A1    Feb. 1, 2018

Related U.S. Application Data (60) Provisional application No. 62/369,285, filed on Aug. 1, 2016.

(51) Int. Cl.
| | |
|---|---|
| *A47C 7/62* | (2006.01) |
| *A47C 31/11* | (2006.01) |
| *A47C 31/00* | (2006.01) |
| *B60N 2/60* | (2006.01) |

(52) U.S. Cl.
CPC .............. *A47C 31/113* (2013.01); *A47C 7/62* (2013.01); *A47C 31/007* (2013.01); *B60N 2/60* (2013.01)

(58) Field of Classification Search
CPC ........ A47C 31/113; A47C 7/62; A47C 31/007
USPC .............................................. 297/219.1–229
See application file for complete search history.

(56) References Cited

U.S. PATENT DOCUMENTS

| | | | | | |
|---|---|---|---|---|---|
| 2,349,193 | A * | 5/1944 | Pass | ........................ | A47C 31/11 |
| | | | | | 297/225 |
| 6,626,491 | B1 * | 9/2003 | Blome | ........................ | A45F 4/08 |
| | | | | | 297/188.2 |
| 7,448,681 | B1 * | 11/2008 | Spitzer | .................... | A47C 31/11 |
| | | | | | 2/69 |
| 9,072,393 | B2 * | 7/2015 | Friedman | ................ | A47C 31/11 |
| 2006/0103195 | A1 * | 5/2006 | Stanley | .................... | A47C 7/386 |
| | | | | | 297/220 |
| 2011/0086078 | A1 * | 4/2011 | Gooch | .................... | A01N 47/44 |
| | | | | | 424/402 |
| 2011/0198904 | A1 * | 8/2011 | Thomas | .................... | A61G 5/10 |
| | | | | | 297/227 |
| 2014/0059749 | A1 * | 3/2014 | Fofana | ................ | A41D 31/0061 |
| | | | | | 2/457 |
| 2016/0023582 | A1 * | 1/2016 | Looper | ................ | B60N 2/6063 |
| | | | | | 297/220 |

* cited by examiner

*Primary Examiner* — Syed A Islam
(74) *Attorney, Agent, or Firm* — Richard D. Clarke

(57) ABSTRACT

The present invention is directed to an Antimicrobial Disposable Seat Cover that is made of a material that is light, disposable and biodegradable, but resistant to dust mites, bed bugs, lice, mold, fungi, feces, viruses and bacteria, and a whole host of various microorganisms. Moreover, the provided Antimicrobial Disposable Seat Cover product is waterproof, breathable and as easy to use as a conventional disposable toilet seat cover. It will be AstM f1670 tested, and include an indicator of heat or moisture to indicate prior use. Any available pre-manufactured antimicrobial fabric or textile may be used in construction of the provided Antimicrobial Disposable Seat Cover product. Additionally, any fabric or textile that has been finished to exhibit antimicrobial characteristics may be used to configure and construct the present Antimicrobial Disposable Seat Covers provided herein.

20 Claims, 3 Drawing Sheets

ANTIMICROBIAL DISPOSABLE SEAT COVER

FIELD OF THE INVENTION

This application provides an Antimicrobial Disposable Seat Cover that can be used in a wide variety of environments to protect those using the Antimicrobial Disposable Seat Cover from contaminants left behind in commonly encountered venues, especially theater, mass transit, airline, vessel and vehicle seats. More specifically, the Antimicrobial Disposable Seat Cover provided is configured to fold out from a compact package and readily and securely cover any type or size of seat found in theaters, mass transit vehicles, airline seats, vessel seats and vehicle seats.

BACKGROUND OF THE INVENTION

Since the conception of Antimicrobial Disposable Seat Cover the most important thing to provide was a product that was reliable and affordable for the masses who are becoming ever more aware of the dangers of germs and various "creepy crawlers" that attack the human body in order to thrive. By using an Antimicrobial Disposable Seat Cover the world is introduced to a new line of defense products to protect themselves from exposure to the unwanted elements widely spread by human contact.

The Antimicrobial Disposable Seat Cover is an idea that developed over dinner after seeing a movie at a local theater. After extensive research, we found that the things left behind on movie seats by other people made our skin crawl: molds, hundreds of thousands of colonies of fecal matter, strains of flu and colds, *E. coli*, Staph, yeast, lice and bedbugs. An article from Channel 7 (Texas) stated: "it was everywhere, there wasn't a lot of difference where you tested whether it was the seat, the headrest, the armrest or the floor. They were all heavily contaminated." And in an ABC 20/20 article, they said the following: "You have to be aware that the armrest, the seat and other areas of the theater are contaminated with the public that sat before you," Tierno told 20/20. "When you wear short pants, or have open lesions in the skin, you might subject yourself to a risk of an infection."

The not-so-Contaminated Seats:

In recent studies, the following seats contained low bacteria counts and/or harmless bacteria that were less likely to make you sick: a driver's seat, a New York City taxi seat, a San Francisco restaurant seat, a Hotel lobby seat, a Hotel room seat, a Bay Area Rapid Transit (BART) seat, and a toilet seat.

The Badly Contaminated Seats:

These seats contained high bacteria counts, including *E. Coli*. (The strains of *E. coli* found are not the deadly type, but are an indicator of the presence of fecal matter): a Movie theater seat, an Airport lounge seat, an Airplane seat, a Rental car seat, and a Park bench.

The thought of shoe booties worn by hospital personnel was the initial dream child to this product. The material needs to be light, disposable and biodegradable, but resistant to: Dust Mites, Bed Bugs, Lice, Mold, Feces and Bacteria/Viruses. This product also needed to be waterproof, breathable and as easy to use as a toilet seat cover. It will also need to be AstM f1670 tested just like the shoe booties for the hospitals. My research took me into the depths of a subject I never thought to look at. But now that I have, time is of the essence on the battle against inevitable exposure and illness. The following is detailed information on what happens and how it happens when exposed to Mold, Feces, Bacterial Viruses, and then Bed Bugs and Lice. All things all of us would rather live without.

Contact Transmission:

Contact transmission of a microorganism occurs when someone has direct contact with the infectious agent. This contact may be simple skin-to-skin contact such as touching a contaminated wound or a contaminated object. Contact transmission is one of the ways that the cold and the influenza viruses are transmitted. These viruses are expelled when an infected person breathes, coughs, or sneezes and the virus settles on objects in the environment, objects such as a computer keyboard, a doorknob, or a telephone receiver, or in this case, seats/chairs. An uninfected person will touch that object, touch her/his nose or mouth and the virus enters the respiratory tract.

Other relatively common diseases that are spread through contact transmission are hepatitis A (contact with infected stool), methicillin-resistant *staphylococcus aureus* (commonly known as MRSA), and many microorganisms that contaminate wounds. Contact transmission of a pathogen is possible by contact with almost any infected body fluid, e.g., saliva, blood, mucus, and semen. Sweat and tears are not generally considered to be high-risk body fluids and contact transmission of a pathogen from these fluids would be very unlikely.

Droplet Transmission:

Droplet transmission could be considered to be a mix of airborne transmission and contact transmission. Droplet transmission occurs when an infected person breathes, coughs, sneezes, or talks and small droplets that are contaminated enter the air and are breathed in by other people. Droplet transmission can also happen during medical procedures such as suctioning. Most experts feel that droplet transmission only occurs within an area of three feet from an infected person (Note: Some people feel the distance may be up to 10 feet). Diseases that can be spread by droplet transmission include influenza, mumps, and pertussis, also known as whooping cough.

As a person who can make common sense decisions, we can move away from infected people when they start coughing and sneezing. But unfortunately, we can't control people who have already been where you are and have spread and left behind possible germs waiting to attack.

Contact transmission is easily overlooked. Viruses and bacteria live everywhere and even brief and casual contact with something that is contaminated is enough for a microorganism to move from that object or body fluid to you.

So, infectious pathogens are everywhere in the environment and there are many ways they can be spread. It might seem surprising then that most of us are healthy so much of the time. However, for disease transmission to occur, the proper conditions must be in place. Movement of a microorganism from one person to another is just the first step in the development of an infection. For the infection to progress to the development of an infectious illness that produces signs and symptoms, the following factors have to be in place: (1) The microorganism must be capable of causing an illness: it must be a pathogen: (2) The pathogen must be strong enough to cause an illness: it must be virulent: (3) The pathogen must be strong enough to resist the immune system: (4) There must be a sufficient number of the pathogens: (5) The pathogen must move from person-to-person: transmission mechanism: (6) There must be an entry point: airborne, blood, physical contact, etc.: and (7) The victim—commonly called the host—must be susceptible.

Infection Control—Standard Precautions

Infection control starts with standard precautions. Standard precautions are the methods recommended by the Centers for Disease Control and Prevention (CDC) for preventing the transmission of infections. These standard precautions include: Hand washing, Respiratory hygiene/cough etiquette, safe hypodermic needle injection practices, and the proper use of personal protective equipment (PPE)

But we are all very aware that many people don't follow this advice. Blood and all body fluids and secretions (with the exception of sweat and tears) should always be considered potentially infectious. Of course, personal care inevitably involves the possibility of exposure to blood and body fluids and secretions. It is possible that you could be in close contact with someone who has a communicable illness or a high level of a pathogen and either you or others around you know. So, standard precautions are always used when delivering care. Infection control is extremely important. It has been estimated that each year millions of people develop illnesses because microorganisms are spread to them.

As far as risk assessment, the first thing to remember is that infection control is intended to prevent the transmission of microscopic pathogens that are literally everywhere. And these pathogens are very easily spread. It may seem that simply touching a computer keyboard or a telephone receiver for a few seconds could not be enough exposure to pick up bacteria or a virus and move it from you to someone else, but that's not so. It is very easy to become careless and complacent about pathogen transmission—"spreading germs." But once again, studies have clearly shown that it's much, much easier for this to happen than you would imagine. If in doubt, consider the situation to be a risk, and practice good infection control. Good infection control always starts with you, however, the "always starts with you" has a new line of defense to help keep you from being exposed to those little monsters that like to hide! Now that we all know the dangers of viruses, mold and such, let's move on to the creepy crawlers.

Lice: Lice are small bloodsucking insects that live on the skin of mammals and birds. Three species of lice have adapted themselves to humans: the head louse (*Pediculus humanus capitis*), the body louse (*Pediculus humanus*) and the crab or pubic louse (*Pthirus pubis*). All three species occur worldwide. Lice infestations can cause severe irritation and itching. In addition, the body louse can transmit typhus fever, relapsing fever and trench fever.

The three species of lice live only on humans (not normally on animals) and feed on human blood; the life cycle has three stages: egg, nymph and adult. Development from egg to adult takes about two weeks. The white eggs (called nits) are glued to a hair or, in the case of the body louse, to fine threads on clothes. The nymphs are similar to the adults but much smaller. Fully grown lice are up to 4.5 mm long and feed by sucking blood. Feeding occurs several times a day. Lice can only develop in a warm environment close to human skin, and die within a few days if they lose contact with the human body. They are normally spread by contact, e.g. in overcrowded sleeping quarters and other crowded living conditions. The three species of human lice are found on different parts of the body: (1) the head louse occurs on the scalp and is most common in children on the back of the head and behind the ears; (2) the pubic louse or crab louse is mainly found on hair in the pubic region but may spread to other hairy areas of the body and, rarely, the head; and (3) the body louse occurs in clothing where it makes direct contact with the body, it is similar to the head louse but slightly bigger.

Body Lice:

Body lice are most commonly found in clothing, especially where it is in direct contact with the body, as in underwear, the crotch or fork of trousers, armpits, waistline, collar and shoulders. They attach themselves to body hair only when feeding. The eggs are attached to thin threads of clothing. Body lice are most common in colder areas where people do not frequently wash or change clothes. Body lice are spread by close contact between people. They are most commonly found, therefore, on people living in overcrowded, unhygienic conditions, as in poorly maintained jails, refugee camps and in trenches during war. They also spread by direct contact between people in crowded transport vehicles and markets. Body louse infestations may also be acquired through sharing bedding, towels and clothing or by sitting on infested seats, chair covers or cushions.

Head Lice:

The head louse is the most common louse species in humans. It lives only in the hair on the head and is most often found on children. The eggs (or nits) are firmly glued to the base of hairs of the head, especially on the back of the head and behind the ears. Because the hairs grow about a centimeter a month it is possible to estimate the duration of an infestation by taking the distance between the scalp and the furthest egg on a hair. Infested persons usually harbor 10-20 adult head lice. The females lay 6-8 eggs per day. Head lice are spread by close contact between people, such as children at play or sleeping in the same bed. Head lice are also spread by the use of other people's combs that carry hairs with eggs or lice attached.

Crab or Pubic Lice:

Crab lice, also called pubic lice, are greyish-white and crab-like in appearance. They are most often found on hair in the pubic region, and eggs are laid at the base of the pubic hair. Heavy infestations may spread to other hairy areas of the body, such as the chest, thighs, armpits, eyelashes, eyebrows and beard. Crab lice are mainly spread through sexual or other close personal contact, and are most common in young, sexually active adults.

Public Health Importance:

Only the body louse is a vector of human diseases. It transmits typhus fever, relapsing fever and trench fever.

Louse-Borne Typhus Fever:

This disease is caused by a microorganism, *Rickettsia prowazekii*, and is an acute, highly infectious disease with headache, chills, and fever and general pains as symptoms. It may be fatal in 10-40% of untreated cases. The disease has occurred on all continents except Australia. It is prevalent in cool areas where heavy clothing is worn and where the vector is most common. In the past the disease was most common during war and famine. Today, foci of transmission are found in mountainous regions of South America, in Central and East Africa and in the Himalayas.

Transmission:

Body lice take the disease organisms up with the blood of an infected person and then expel it with their feces. Since louse feces dry to form a fine black powder they are easily blown about. The powder can infect small wounds, such as those caused by scratching, or the mucous membranes of the nose and mouth. Because the disease organism can remain alive for at least two months in dried louse feces, it is dangerous to handle the clothing or bedding of people with typhus.

With these very grim facts listing all the many things that we can contract, just by touching something or someone in a movie theater, restaurant, car, bus, plane, subway, and places of business or beyond, it's up to each individual to help prevent and/or lessen such contacts with a simple yet effective idea. This product can be immediately accessible world-wide for those who care about their health, once mass production begins. This product will be cost effective to the maker and to the consumer. This product will be in great demand, but has never been available. This product has the potential to be an asset to everyone worldwide on a personal level and an asset to companies everywhere across the globe. The Antimicrobial Disposable Seat Cover has far more potential than just for movie seats. It can be readily used with: Dining chairs, Bus seats, Plane seats, Office seats, Car seats, Benches, Baby chairs/highchairs, Baby seat on grocery carts, Bed sheets (fitted and top/every size), Runners for carpets, Pillow cases, School desks, Table covers and airline seat tray covers.

The Antimicrobial Disposable Seat Cover also has what it takes to be used in all hospitals and emergency services. Each special design will mostly be a one size fits all. They will be designed to be a one-time use per piece. This product keeps the consumer protected with no cross-contamination from a used one. It will be soft to the touch and a product that will be welcomed into the lives of everyone.

A germ free environment is very important to many people even when it's clear that it's almost impossible. This is where the Antimicrobial Disposable Seat Cover comes into play and will make a huge and pain free change for those who are conscious about or scared of germs and have no desire to leave their home because of the fear of getting sick. The time has come for everyone to start enjoying life and having control over their fears.

Numerous innovations for seat covers have been provided in the prior art that are described as follows. Even though these innovations may be suitable for the specific individual purposes to which they address, they differ from the present design as hereinafter contrasted. The following is a summary of those prior art patents most relevant to this application at hand, as well as a description outlining the difference between the features of the Antimicrobial Disposable Seat Cover and the prior art.

U.S. Pat. No. 5,806,925 of Mark G. Hanley describes a breathable and washable protective seat cover for automobile seats or the like which comprises a multi-layer construction that has been configured to form a pocket at one end that fits over the upper end of the seat and an elongated section that loosely covers the front surfaces of the seat. Layers comprise an absorbent upper layer and a vapor permeable liquid-blocking lower layer. The upper layer wicks moisture away from the occupant and readily releases it through evaporation, the lower layer provides a breathable property while blocking liquid water, sweat, mud, and the like; thereby protecting the underlying upholstery and providing a comfortable seating surface. The seat cover materials and loose-fitting geometry facilitates and withstands frequent installation-removal-laundering cycles. The lower polymeric membrane layer additionally provides a rubbery texture that grips the car seat upholstery to prevent movement or bunching of the seat cover when an individual enters the seat. Also, an integral draw cord and toggle closure provides a self-storing mechanism which simplifies packing and transport of the seat cover between uses.

This patent describes a breathable and washable protective seat cover for automobile seats or the like the layers comprise an absorbent upper layer and a vapor permeable liquid-blocking lower layer. This patent does not provide a seat cover that is disposable and has the antimicrobial protection provided by the Sure-Chek® medical fabrics, or the like, or be tested to pass the AstM f1670 qualifications just like the shoe booties for the hospitals.

U.S. Pat. No. 6,948,771 of Lyndon Salandy describes a portable seat cover to cover the back of a variety of seats has drawstrings on its side to adjust to a variety of seat backs, a head rest that is stowable when there are no headrests to cover, and a built-in pouch into which can be folded the portable seat cover.

This patent also does not provide a seat cover that is disposable and has the antimicrobial protection provided by the Sure-Chek® medical fabrics, or the like, or be tested to pass the AstM f1670 qualifications just like the shoe booties for the hospitals.

U.S. Pat. No. 7,600,813 of Larry L. Lanham et al. describes a seat cover adapted to removably cover a seat in an automobile includes a cover body being formed from one layer of non-woven material which may be made from spunbond-meltblown-spunbond (SMS) fibers. The cover body has a longitudinal direction and a pair of ends. The cover body defines a pair of pockets adapted to receive portions of the seat with the pockets disposed at opposite ends of the cover body.

This patent also does not provide a seat cover that is disposable and has the antimicrobial protection provided by the Sure-Chek® medical fabrics, or the like, or be tested to pass the AstM f1670 qualifications just like the shoe booties for the hospitals.

U.S. Pat. No. 7,607,732 of Michael Beroth, et al. describes a one-piece upholstery cover that covers all the visible surfaces of a typical seat such as seatback cushion, seat pan cushion, seat pan extension cushion, leg rest cushion, and leg rest extension cushion. A seat covering system is also disclosed. The seat covering system includes a single elongated piece of upholstery having a first end and a second end and a loop portion intermediate the first and second ends. A first attachment portion is adjacent to the first end of the upholstery, and at least one spring mechanism attached to the second end. A first and second pivot member are attached to opposite sides of a seat back of a reclining chair. These first and second pivot members are also fixed to a seat pedestal while a connecting member having a first end attached to the first pivot member and a second end attached to the second pivot member extends through the loop portion of the elongated piece of upholstery.

This patent also does not provide a seat cover that is disposable and has the antimicrobial protection provided by the Sure-Chek® medical fabrics, or the like, or be tested to pass the AstM f1670 qualifications just like the shoe booties for the hospitals.

U.S. Pat. No. 7,695,066 of Suzette A. Guercia, et al. describes a single-use disposable sanitary cover temporarily houses a portion of a seat and mitigates virus and germ contact on a person's body. The disposable sanitary cover includes a flexible elongated sleeve having an outer shell, an interior cavity and an elongated slit forming a rim equipped with a stabilizing means integrally associated therewith. The stabilizing means is preferably an elastic band or segment that engages with the rear of the back support and seat areas of the chair to secure the elongated sleeve in place. The seat area and/or back support area of the chair is received through the elongated slit and is housed within the elongated sleeve in order to mitigate contact between the chair surface and a person's body.

This patent describes a single-use disposable sanitary cover temporarily houses a portion of a seat and mitigates virus and germ contact on a person's body similar to a toilet seat cover. It does not describe the multi-layer construction required to pass the AstM f1670 qualifications just like the shoe booties for the hospitals. It does not also offer the capabilities of being used on theater seats.

U.S. Pat. No. 8,287,041 of Victoria Paulin describes a folding chair cover comprised of first and second sheets of non-woven fabric attached together along strategically sized and shaped respective edges thereof. The non-woven sheets are cut from bolts of non-woven fabric in such a manner as to effectively use the least amount of non-woven material in the creation of the covers.

This patent also does not provide a seat cover that is disposable and has the antimicrobial protection provided by the Sure-Chek® medical fabrics, or the like, or be tested to pass the AstM f1670 qualifications just like the shoe booties for the hospitals.

None of these previous efforts, however, provides the benefits attendant with the Antimicrobial Disposable Seat Cover. The present design achieves its intended purposes, objects and advantages over the prior art devices through a new, useful and unobvious combination of method steps and component elements, with the use of a minimum number of functioning parts, at a reasonable cost to manufacture, and by employing readily available materials.

In this respect, before explaining at least one embodiment of the Antimicrobial Disposable Seat Cover in detail it is to be understood that the design is not limited in its application to the details of construction and to the arrangement of the components set forth in the following description or illustrated in the drawings. The Antimicrobial Disposable Seat Cover is capable of other embodiments and of being practiced and carried out in various ways. In addition, it is to be understood that the phraseology and terminology employed herein are for the purpose of description and should not be regarded as limiting.

SUMMARY OF THE INVENTION

The principle advantage of the preferred embodiment of the Antimicrobial Disposable Seat Cover is that it can be used for a variety of different seats.

Another advantage of the preferred embodiment of the Antimicrobial Disposable Seat Cover is that it is very light weight, biodegradable and stored in a vacuum sealed package.

Another advantage of the preferred embodiment of the Antimicrobial Disposable Seat Cover is it will fit a wide variety of both public and private seats, including airline seats and armrests.

Another advantage of the preferred embodiment of the Antimicrobial Disposable Seat Cover is it will be inexpensive to fabricate and be disposed of after being used.

Another advantage of the preferred embodiment of the Antimicrobial Disposable Seat Cover is it will have a pouch in the leg section to store articles or trash.

Another advantage of the preferred embodiment of the Antimicrobial Disposable Seat Cover is it will have an optional mechanism to indicate if the seat cover has been used.

Another advantage is the Antimicrobial Disposable Seat Cover is that it can be used with or without the armrest covers that can be attached by the means of adhesive strips or hook and loop strips such as VELCRO® strips, or the like.

Another advantage of the preferred embodiment of the Antimicrobial Disposable Seat Cover is its inherent protection from a wide variety of common hazardous elements, as well as microorganisms.

An advantage of the first alternate embodiment of the Antimicrobial Disposable Seat Cover is it comes as a one-piece article with the arm rest covers attached and a slip over headrest cover.

Another advantage of the first alternate embodiment of the Antimicrobial Disposable Seat Cover is it can be fabricated from the antimicrobial materials and can be made from conventional decorative fabrics, flame and fire-resistant fabrics and padding.

Another advantage of the first alternate embodiment of the Antimicrobial Disposable Seat Cover is it will have a storage pouch attached to the leg section.

An advantage of the second alternate embodiment of the Antimicrobial Disposable Seat Cover is the simplest version with the central portion only having elastic straps on the headrest and seat areas for attachment.

The preferred embodiment of the Antimicrobial Disposable Seat Cover consists of a headrest panel, a backrest panel a seat panel and leg panel with a pouch to store articles or trash. The right and left armrest covers will be attached by the means of adhesive or hook and loop fastener (VELCRO®) strips. A flexible elastic belt will wrap around the headrest of the seat to hold the seat cover in place. This Antimicrobial Disposable Seat Cover has been designed for a one-time usage only and biodegradable to be thrown away afterwards. It will be made from Sure-Chek® brand medical fabrics, or the like, that are the original healthcare fabrics patented for use as protective covering fabrics and today are the standard in the industry. Sure-Chek® medical fabrics, or the like, were developed in cooperation with healthcare professionals to provide industrial fabrics that are comfortable, safe and effective for use in healthcare facilities, prison industries, jails, camps, and dormitories. These thermoplastic fabric composites are strong, durable, antimicrobial, antistatic, fire and flame resistant, stain, odor, fluid resistant, and resistant to popular disinfectants when used as directed. The Antimicrobial Disposable Seat Cover will be made in the same manner, and in similar materials and fabrics, as the shoe booties worn by hospital personnel.

The first alternate embodiment of the Antimicrobial Disposable Seat Cover consists of a seat panel having the arm rests attached, with the back panel and leg panel. The seat panel will have a heat or moisture detection area that will identify if the Antimicrobial Disposable Seat Cover has been used. A pouch is attached at the lower end of the leg panel. This Antimicrobial Disposable Seat Cover will also be made from Sure-Chek® brand medical fabrics, or the like, but will be made of a more durable form of the material and could be used more than one time.

The second alternate embodiment of the disposable Antimicrobial Disposable Seat Cover has been designed to be used on an automobile seat. It will have an elastic strap attached to the back panel and a second elastic strap attached to the seat panel. A pouch will be part of the short leg panel. This Antimicrobial Disposable Seat Cover will also be made from Sure-Chek® brand medical fabrics, or the like, but has been designed for a one-time usage only and to be thrown away afterwards.

The foregoing has outlined rather broadly the more pertinent and important features of the present Antimicrobial Disposable Seat Cover in order that the detailed description of the application that follows may be better understood so that the present contribution to the art may be more fully appreciated. Additional features of the design will be described hereinafter which form the subject of the claims of this disclosure. It should be appreciated by those skilled in the art that the conception and the disclosed specific embodiments may be readily utilized as a basis for modifying or designing other products and methods for carrying out the same purposes of the present application. It should also be realized by those skilled in the art that such equivalent constructions and methods do not depart from the spirit and scope of this application as set forth in the appended claims.

BRIEF DESCRIPTION OF THE DRAWINGS

The accompanying drawings, which are incorporated in and form a part of this specification, illustrate embodiments of the Antimicrobial Disposable Seat Cover and together with the description, serve to explain the principles of this application.

For a fuller understanding of the nature and advantages of the Antimicrobial Disposable Seat Cover reference should be had to the following detailed description taken in conjunction with the accompanying drawings which are incorporated in and form a part of this specification, illustrate embodiments of the design and together with the description, serve to explain the principles of this application.

DETAILED DESCRIPTION OF THE PREFERRED EMBODIMENTS

Figures 1, 2, 3:
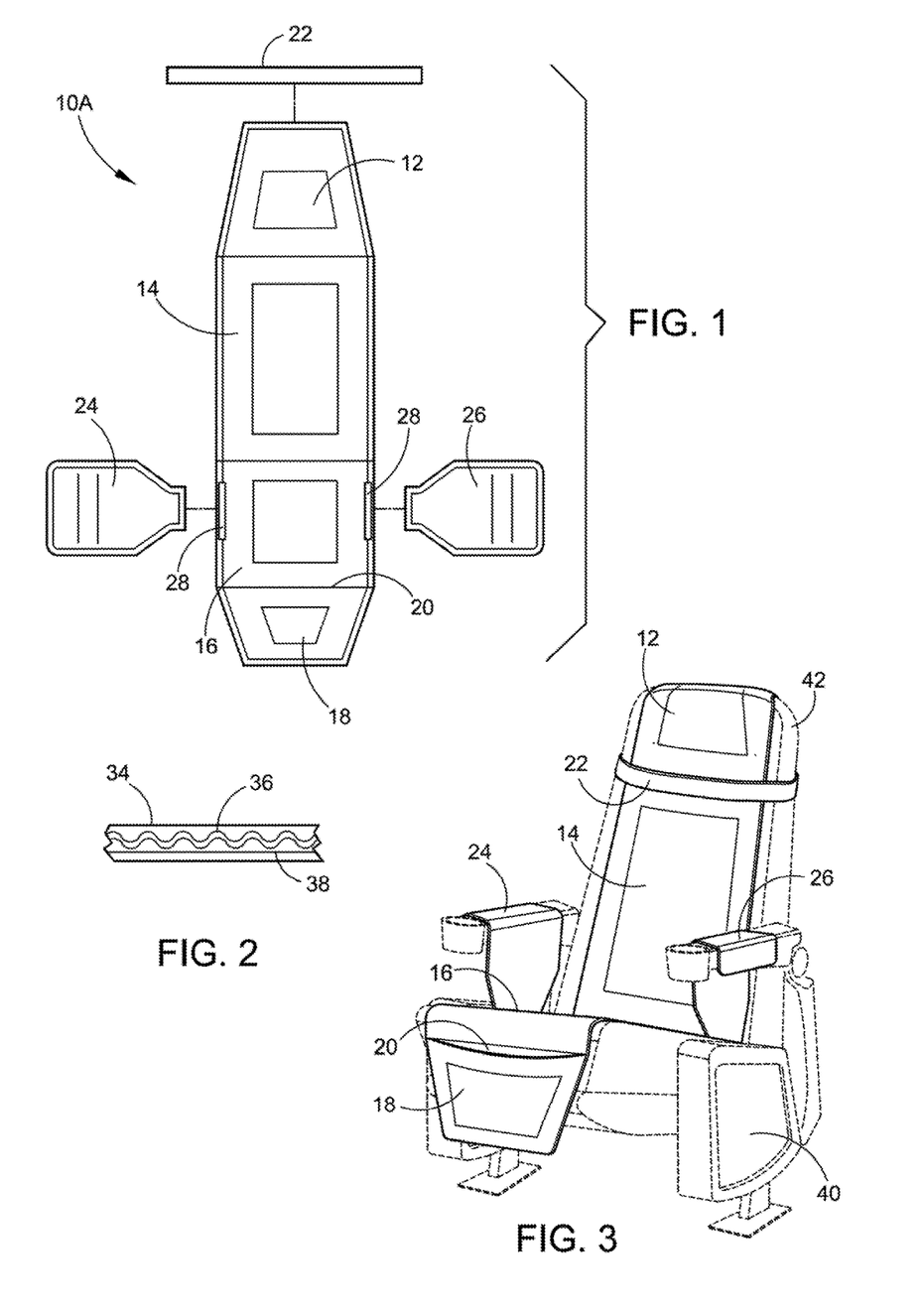
FIG. 1 depicts the preferred embodiment of the disposable Antimicrobial Disposable Seat Cover with the separate parts exploded away.
FIG. 2 depicts a cross section of an alternate material used on the disposable Antimicrobial Disposable Seat Cover.
FIG. 3 depicts a perspective view of the preferred embodiment of the disposable Antimicrobial Disposable Seat Cover on a conventional theater seat.

Referring now to the drawings, wherein similar parts of the Antimicrobial Disposable Seat Cover 10A. 10B and 10C are identified by like reference numerals, there is seen in FIG. 1 the preferred embodiment of the disposable Antimicrobial Disposable Seat Cover 10A consisting of a headrest panel 12, a backrest panel 14 a seat panel 16 and leg panel 18 with a pouch 20 to store articles or trash. The flexible elastic belt 22, the right armrest cover 24 and left armrest cover 26 that will be attached by the means of adhesive or hoop-loop strips 26 have been exploded away.

FIG. 2 depicts a cross section of the material used on the disposable Antimicrobial Disposable Seat Cover 10A that will be made with an upper layer 34 of a conventional semi-permeable breathable fabric, a center section 36 made from antimicrobial fabric such as Herculite®, Sure-Check® Medical Fabrics, or the like, and lower section 38 constructed using a conventional waterproof, flame resistant or moisture resistant material. It is anticipated that the conventional fabric used could be any of the following: vinyl, polyurethane, PVC-coated polyester, polyurethane backed with a polyester/cotton blend, silicone elastomer-coated fabrics, CRYPTON®-treated fabrics, silver ion coated or embedded fabrics and nylon based fabrics.

In addition, there are a number of antimicrobial, antifungal and anti-bacterial fabrics on the market and being sold under their trademarked names, such as CERTAINTY®, CERTAINTY PLUS®, NANOTEX®, HERCULITE®, MICROBAN® and TREVIRA®, all of which would be suitable for the purpose of manufacturing this Antimicrobial Disposable Seat Cover as described and taught by the present invention herein.

Moreover, any fabric or textile may be "finished" to have antimicrobial properties built in. The definition of an antimicrobial finished fabric is: antimicrobial fabrics and textiles are fiber-based substrates to which antimicrobial agents have been applied at the surface, or incorporated into the fibers, rendering a product that kills or inhibits the growth of microorganisms. In this regard, any fabric or textile that has been finished to exhibit antimicrobial characteristics may be used to construct the present Antimicrobial Disposable Seat Cover invention.

An example of this is the success that researchers have had with embedding silver and silver compounds into fabrics. With a well-established ability to kill off bacteria, silver has come to play a significant role in the development of antimicrobial materials. Indeed, we've seen it used in keyboards, built into water filtration systems and deployed in washing machines as a means of fending off germs. The latest effort to harness the bacteria-fighting qualities of silver comes from researchers at Australia's RMIT University working with scientists from the CSIRO, who have developed an antibacterial fabric capable of killing off *E. coli* and other infectious bacteria within 10 minutes of contact. The team developed the antibacterial fabric by embedding sets of nanowires loaded with silver-TCNQ into a cotton textile. After being coated in a silver solution, the nano-arrays began to slowly release silver-ions that killed off bacteria as they came into contact. The fabric can be built into most materials; such as cotton or nylon. Further to the fast-acting nature of the fabric, also emphasized was its longevity as a potential advantage over other antibacterial fabrics. The antimicrobial longevity involves the nanowires dissolving slowly, which will work to extend the life of the material, it was observed that after dipping the fabric in the solution, the silver ions responsible for killing off the bacteria were still being released after five days.

FIG. 3 depicts a perspective view of the preferred embodiment of the disposable Antimicrobial Disposable Seat Cover 10A on a conventional theater seat 40 where the flexible elastic belt 22 is secured around the theater seat headrest 42 to hold the headrest panel 12 in place.

Figures 4, 5, 6, 7:
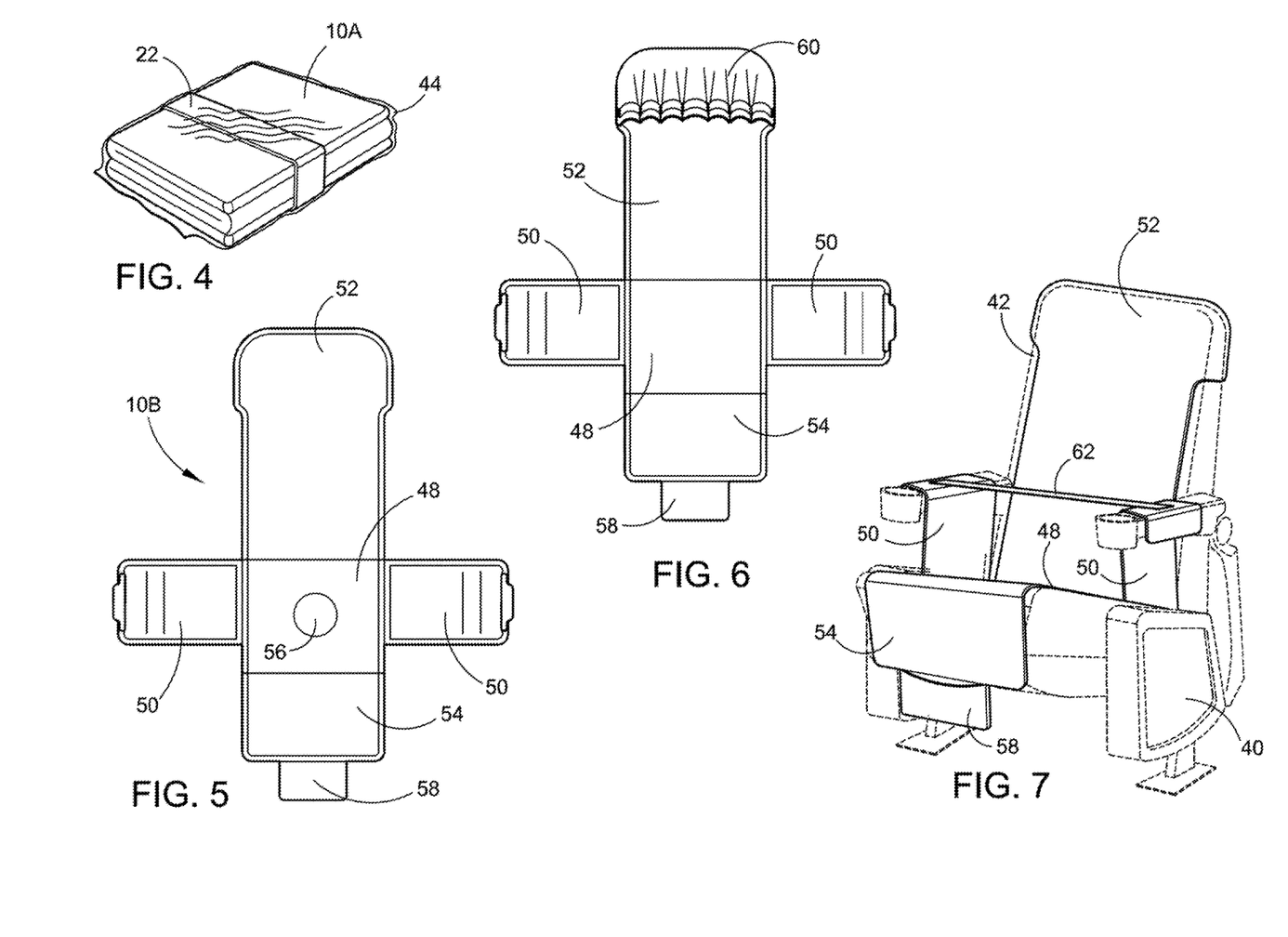
FIG. 4 depicts the preferred embodiment of the disposable Antimicrobial Disposable Seat Cover in the folded condition in a vacuum sealed container.
FIG. 5 depicts a front view of the first alternate embodiment of the disposable Antimicrobial Disposable Seat Cover folded out with a different configuration.
FIG. 6 depicts a rear view of the first alternate embodiment of the disposable Antimicrobial Disposable Seat Cover folded out with a different configuration.
FIG. 7 depicts a perspective view of the first alternate embodiment of the disposable Antimicrobial Disposable Seat Cover on a conventional theater seat.

FIG. 4 depicts the preferred embodiment of the disposable Antimicrobial Disposable Seat Cover 10A in the folded condition in a vacuum sealed container 44. The pouch section 58 attached at the lower end of the leg panel 54 acts as a package for containing the Antimicrobial Disposable Seat Cover prior to use.

FIG. 5 depicts a front view of the first alternate embodiment of the disposable Antimicrobial Disposable Seat Cover 10B folded out with the seat panel 48 having the armrests 50 attached, with the back panel 52 and leg panel 54. The seat panel 48 will have one or more indicator elements, here shown as a heat or moisture detection area 56 that will identify if the Antimicrobial Disposable Seat Cover 10B has been used. The indicator element heat or moisture detection area 56 will function to indicate prior use of the seat cover by a physical change and a visual change of said indicator element. This heat or moisture detection area 56 will change color after exposure to heat or moisture, indicating prior use of the seat cover. Previously used seat covers as indicated by indicator element 56, are readily removed and disposed of. A pouch 58 is attached at the lower end of the leg panel 54. When the seat cover is deployed, this pouch 58 can be used to hold valuables, trash, or any other items the user wishes to store while using the seat cover so equipped.

FIG. 6 depicts a rear view of the first alternate embodiment of the disposable Antimicrobial Disposable Seat Cover 10B folded out with the seat panel 48 having the armrests 50 attached with the back panel 52 and leg panel 54. The back panel 52 has a seat back section 60 that slips over the back of the theater seat headrest 42.

FIG. 7 depicts a perspective view of the first alternate embodiment of the disposable Antimicrobial Disposable Seat Cover 10B on a conventional theater seat 40 with the seat panel 48 having the armrests 50 attached with the back panel 52 and leg panel 54. The armrests 50 have an indicator element in the form of a thin plastic strip 62 attached that will be removed or broken when a person sits in the seat 40, thereby indicating prior use of the seat cover. Thus, the indicator element in the form of a thin plastic strip 62 will function to indicate prior use of the seat cover by a physical change and a visual change of said indicator element. A pouch 58 is attached at the lower end of the leg panel 54. When the seat cover is deployed, this pouch 58 can be used to hold valuables, trash, or any other items the user wishes to store while using the seat cover so equipped.

Figure 8:
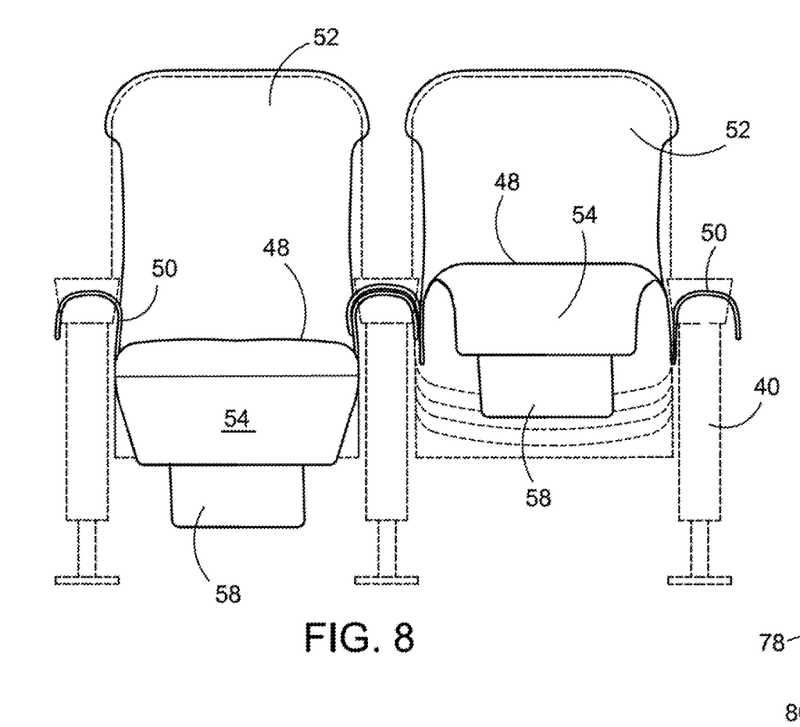
FIG. 8 depicts a front view of two first alternate embodiments of the disposable Antimicrobial Disposable Seat Cover on conventional theater seats.

FIG. 8 depicts a front view of two first alternate embodiments of the disposable Antimicrobial Disposable Seat Cover 10B on conventional theater seats 40 with one folded down and the other folded up.

Figure 9:
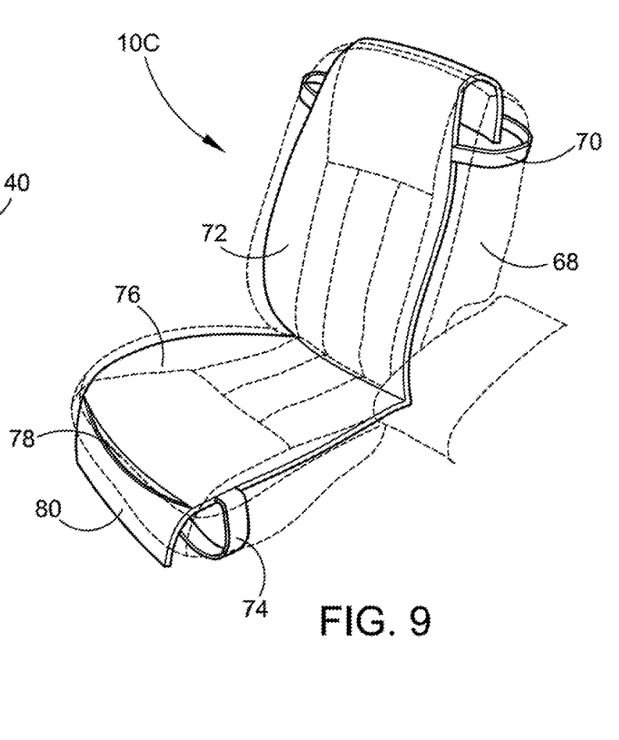
FIG. 9 depicts a perspective view of the second alternate embodiment of the disposable Antimicrobial Disposable Seat Cover used on an automobile seat.

FIG. 9 depicts a perspective view of the second alternate embodiment of the disposable Antimicrobial Disposable Seat Cover 10C used on an automobile seat 68 with an elastic strap 70 attached to the back panel 72 and a second elastic strap 74 attached to the seat panel 76. A pouch 78 will be part of the short leg panel 80. It is anticipated that, with the increase in ride-sharing activities, similar to those performed by companies like UBER®, and the like, UBER® and other ride sharing vehicle owners will want to use the present Antimicrobial Disposable Seat Cover to protect their vehicles from contamination and cross-contamination between riders, and on all seats of the vehicle.

The Antimicrobial Disposable Seat Cover 10A, 10B and 10C shown in the drawings and described in detail herein disclose arrangements of elements of particular construction and configuration for illustrating preferred embodiments of structure and method of operation of the present application. It is to be understood, however, that elements of different construction and configuration and other arrangements thereof, other than those illustrated and described may be employed for providing an Antimicrobial Disposable Seat Cover 10A, 10B and 10C in accordance with the spirit of this disclosure, and such changes, alterations and modifications as would occur to those skilled in the art are considered to be within the scope of this design as broadly defined in the appended claims.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

We claim:

1. An antimicrobial disposable seat cover comprising:
   (a) a headrest panel, a backrest panel a seat panel and a leg panel, wherein said leg panel includes a pouch section, and further including an indicator element, wherein said indicator element functions to indicate prior use of the seat cover;
   (b) detachable right and left armrest covers wherein said indicator element includes a thin plastic strip removably attached to said right and left armrest covers and spanning the space above said seat panel; and
   (c) wherein said headrest panel, said backrest panel, said seat panel and said leg panel are constructed using a single layer of antimicrobial fabric;
   whereby a seat cover is provided folded into a compact package and held within said pouch section of said leg panel until unpacked, unfolded and thereby used to cover a seat.

2. The antimicrobial disposable seat cover according to claim 1, wherein said detachable right and left armrest covers are constructed using an antimicrobial fabric and are attachable to said seat panel using hook and loop material strips located on said seat panel and said detachable right and left armrest covers.

3. The antimicrobial disposable seat cover according to claim 1, wherein said headrest panel, said backrest panel, said seat panel and said leg panel are constructed using two layers of conventional fabric and have a single layer of antimicrobial fabric sandwiched therebetween.

4. The antimicrobial disposable seat cover according to claim 1, wherein said headrest panel further includes an integrated elastic border to secure said headrest panel to the headrest portion of a seat.

5. The antimicrobial disposable seat cover according to claim 1, further including a flexible elastic belt to wrap around the headrest portion of a seat to hold the antimicrobial seat cover securely in place on the headrest portion of the seat.

6. The antimicrobial disposable seat cover according to claim 3, wherein said two layers of conventional fabric includes waterproof, flame resistant and breathable conventional fabrics.

7. The antimicrobial disposable seat cover according to claim 1, further including one or more indicator elements, wherein said indicator elements function to indicate prior use of the seat cover by a physical and visual change of said indicator elements.

8. The antimicrobial disposable seat cover according to claim 1, wherein said indicator element includes a thin plastic strip removably attached to said right and left armrest covers and spanning the space above said seat panel, and further wherein said indicator element indicates prior use by said physical and visual change being removal of said thin plastic strip.

9. The antimicrobial disposable seat cover according to claim 7, wherein said indicator element further includes a moisture detection portion located on said seat panel wherein said indicator element indicates prior use by said physical and visual change being the moisture detection portion changes color when exposed to moisture, thereby indicating prior use of the seat cover.

10. The antimicrobial disposable seat cover according to claim 7, wherein said indicator element further includes a heat detection portion located on said seat panel wherein said indicator element indicates prior use by said physical and visual change being the heat detection portion changes color when exposed to heat, thereby indicating prior use of the seat cover.

11. A method for making an antimicrobial disposable seat cover comprising the steps of:
(a) providing a headrest panel, a backrest panel a seat panel and a leg panel, wherein said leg panel includes a pouch section, and further providing an indicator element, wherein said indicator element functions to indicate prior use of the seat cover;
(b) providing detachable right and left armrest covers wherein said indicator element includes a thin plastic strip removably attached to said right and left armrest covers and spanning the space above said seat panel; and
(c) constructing said headrest panel, said backrest panel, said seat panel and said leg panel using a single layer of antimicrobial fabric;
(d) assembling said constructed headrest panel, said backrest panel, said seat panel and said leg panel into a seat cover;
(e) folding said seat cover and said detachable right and left armrest covers into a compact package; and
(f) placing said folded assembled seat cover compact package within said pouch section of said leg panel until said assembled seat cover is unpacked, unfolded and thereby deployed to cover a seat.

12. The method for making an antimicrobial disposable seat cover according to claim 11, wherein said detachable right and left armrest covers are constructed using an antimicrobial fabric and are attachable to said seat panel using hook and loop material strips located on said seat panel and said detachable right and left armrest covers.

13. The method for making an antimicrobial disposable seat cover according to claim 11, wherein said headrest panel, said backrest panel, said seat panel and said leg panel are constructed using two layers of conventional fabric and have a single layer of antimicrobial fabric sandwiched therebetween.

14. The method for making an antimicrobial disposable seat cover according to claim 11, wherein said headrest panel further includes an integrated elastic border to secure said headrest panel to the headrest portion of a seat.

15. The method for making an antimicrobial disposable seat cover according to claim 11, further including a flexible elastic belt to wrap around the headrest portion of a seat to hold the antimicrobial seat cover securely in place on the headrest portion of the seat.

16. The method for making an antimicrobial disposable seat cover according to claim 13, wherein said two layers of conventional fabric includes waterproof, flame resistant and breathable conventional fabrics.

17. The method for making an antimicrobial disposable seat cover according to claim 11, further including one or more indicator elements, wherein said indicator elements function to indicate prior use of the seat cover, and further wherein said indicator elements indicate prior use by a physical and visual change of said indicator elements.

18. The method for making an antimicrobial disposable seat cover according to claim 11, wherein said indicator element includes a thin plastic strip removably attached to said right and left armrest covers and spanning the space above said seat panel, and further wherein said indicator element indicates prior use by said physical and visual change being removal of said thin plastic strip.

19. The method for making an antimicrobial disposable seat cover according to claim 17, wherein said indicator element includes a moisture detection portion wherein said indicator element indicates prior use by said physical and visual change being the moisture detection portion changes color when exposed to moisture, thereby indicating prior use of the seat cover.

20. The method for making an antimicrobial disposable seat cover according to claim 17, wherein said indicator element includes a heat detection portion wherein said indicator element indicates prior use by said physical and visual change being the heat detection portion changes color when exposed to heat, thereby indicating prior use of the seat cover.

* * * * *